(12) United States Patent
Dhanakshirur et al.

(10) Patent No.: US 8,418,139 B2
(45) Date of Patent: *Apr. 9, 2013

(54) SYSTEM AND METHOD FOR UPDATING INITIALIZATION PARAMETERS FOR APPLICATION SOFTWARE FROM WITHIN A SOFTWARE DEVELOPMENT ENVIRONMENT

(75) Inventors: Girish Dhanakshirur, Delray Beach, FL (US); Larissa Guerrero, Miramar, FL (US); Rocco F. Palermo, Jr., Boynton Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 1214 days.

This patent is subject to a terminal disclaimer.

(21) Appl. No.: 12/105,984

(22) Filed: Apr. 18, 2008

(65) Prior Publication Data
US 2009/0265687 A1 Oct. 22, 2009

(51) Int. Cl.
*G06F 9/44* (2006.01)
(52) U.S. Cl.
USPC .......................................................... 717/121
(58) Field of Classification Search ........................ None
See application file for complete search history.

(56) References Cited

U.S. PATENT DOCUMENTS

| | | | |
|---|---|---|---|
| 5,913,218 A * | 6/1999 | Carney et al. .......................... 1/1 |
| 6,901,580 B2 * | 5/2005 | Iwanojko et al. ............. 717/121 |
| 6,968,373 B1 * | 11/2005 | Norris et al. .................. 709/223 |
| 7,584,467 B2 * | 9/2009 | Wickham et al. ............. 717/171 |
| 2004/0010786 A1 * | 1/2004 | Cool et al. .................... 717/170 |
| 2004/0187103 A1 * | 9/2004 | Wickham et al. ............. 717/168 |
| 2006/0129563 A1 * | 6/2006 | Phillips et al. .................. 707/10 |
| 2006/0150217 A1 * | 7/2006 | Joo et al. .......................... 725/50 |
| 2007/0005769 A1 * | 1/2007 | Ammerlaan et al. ......... 709/226 |
| 2007/0180444 A1 * | 8/2007 | Hoover et al. ................ 717/168 |
| 2008/0281949 A1 * | 11/2008 | Aborn .......................... 709/222 |

* cited by examiner

*Primary Examiner* — Jay Morrison
(74) *Attorney, Agent, or Firm* — Fox Rothschild, LLP; Robert J. Sacco

(57) ABSTRACT

A computer implemented method for updating initialization parameters for application software from within a software development environment. The method involves changing a value of at least one initialization parameter contained in a configuration file of a developer computer system. The method also involves starting application software deployed on an application server in response to the value change. Thereafter, the configuration file including the changed value of the initialization parameter is communicated from the developer computer system to the application server. Once the configuration file is received at the application server, the application software is initialized using the configuration file.

8 Claims, 6 Drawing Sheets

SYSTEM AND METHOD FOR UPDATING INITIALIZATION PARAMETERS FOR APPLICATION SOFTWARE FROM WITHIN A SOFTWARE DEVELOPMENT ENVIRONMENT

BACKGROUND OF THE INVENTION

1. Statement of the Technical Field

The present invention relates to the field of software development. More particularly, the present invention relates to systems and methods for updating a configuration file from within a development environment.

2. Description of the Related Art

There are many types of software development systems known in the art. One such software development system is a web application development (WAD) system. The WAD system is generally comprised of a developer computer system (DCS) and an application server. The DCS is typically a desktop personal computer system, a laptop personal computer system, a personal digital assistant, a mobile computing device, or any other general purpose computer processing device. The DCS is generally comprised of an open development platform including frameworks, software tools, and runtimes for building, deploying, and managing software. One example of a DCS is an Eclipse platform providing an Integrated Development Environment (IDE) tool for writing enterprise, client, servlet, php-based, and/or html-based application code in a particular computer language (e.g., Java, C, and C++). The DCS is typically directly or indirectly communicatively connected to the application server via a network.

An application server can be comprised of NetBeans including J2EE (Java 2, Enterprise Edition) support modules for creating, developing, deploying, and testing J2EE applications, Enterprise JavaBeans (EJB) components, Servlets, and web services. The application server can also be comprised of managed beans (MBeans) for managing resources of the application server and communications between the DCS and the application server. The application server can further be comprised of hardware and/or software configured to access, initialize, and run a website application deployed thereon. The initialization of the web application generally involves accessing a configuration file stored in a memory of the DCS (or database) and loading the configuration file including configuration parameters. The term "load" as used herein refers to the process of transferring files from one memory device to another memory device. The configuration parameters can include, but are not limited to, information defining the number of databases to be used by the web application and information defining service behaviors to be provided by the web application.

The above described conventional WAD system suffers from certain drawbacks. For example, the server is restarted each time a configuration file is modified by a developer. As should be understood, a server restart process generally involves initializing and launching system software (such as, device driver software, an operating system, platform provider software, platform service software, and application software). Also, the configuration file needs to be loaded during each initialization of the web application. One can appreciate that a user of the DCS may change the configuration parameters of the configuration file numerous times during a web application development and testing process. If the web application is running on the application server, then the configuration file is uploaded from the DCS (or database) each time at least one configuration parameter is changed by the user. One can appreciate that the server re-start and configuration file loading (or re-loading) features of the conventional WAD system provide an inefficient and time consuming application testing process. As such, there is a need for an improved system and method for updating a configuration file during or prior to the initialization of a software application deployed on an application server.

SUMMARY OF THE INVENTION

This Summary is provided to comply with 37 C.F.R. §1.73, requiring a summary of the invention briefly indicating the nature and substance of the invention. It is submitted with the understanding that it will not be used to interpret or limit the scope or meaning of the claims.

The present invention concerns systems and computer implemented methods for updating initialization parameters for application software from within a software development environment. The methods involve changing a value of at least one initialization parameter contained in a configuration file of a developer computer system. In response to the value change, application software deployed on an application server is started. Notably, the application server is communicatively connected to the developer computer system. Subsequent to starting the application software, a configuration file including the changed value is communicated from the developer computer system to the application server. This communication can be achieved using streaming technology. Thereafter, the application software is initialized using the configuration file.

The present invention also concerns machine-readable mediums having stored thereon instructions, which when executed by a machine, cause the machine to perform certain operations. The operations include changing a value of at least one initialization parameter contained in a configuration file of a developer computer system and starting application software deployed on an application server in response to the value change. The operations also involve communicating the configuration file from the developer computer system to the application server subsequent to starting the application software. The operations further involve initializing the application software using the configuration file.

BRIEF DESCRIPTION OF THE DRAWINGS

Embodiments will be described with reference to the following drawing figures, in which like numerals represent like items throughout the figures, and in which.

DETAILED DESCRIPTION OF THE PREFERRED EMBODIMENTS

Embodiments of the present invention provide systems and methods for updating a configuration file (including initialization parameters) during or prior to an initialization of application software deployed on an application server. Notably, the methods of the present invention overcome certain drawbacks of conventional configuration file updating methods. In particular, the methods of the present invention eliminate the need to restart an application server in its entirety (i.e., initialize and launch system software such as device driver software, an operating system, platform provider software, platform services software, and applications software) each time a configurations file is modified. Rather, methods of the present invention instead restarts only the applications software (affected by the a changed configuration file) each time the configuration file is modified.

The phrase "application software", as used herein, can refer to an end-user program that is unable to run without system software. Such end-user programs can include, but are not limited to, web-based programs, spreadsheet based programs, word processor programs, and database programs. The phrase "system software", as used herein, can refer to low-level programs that interact with a computer at a basic level. System software can include, but is not limited to, operating systems, compilers, and system utilities for managing computer resources.

The invention will now be described more fully hereinafter with reference to accompanying drawings, in which illustrative embodiments of the invention are shown. This invention, may however, be embodied in many different forms and should not be construed as limited to the embodiments set forth herein. For example, the present invention can be embodied as a method, a data processing system, or a computer program product. Accordingly, the present invention can take the form as an entirely hardware embodiment, an entirely software embodiment, or a hardware/software embodiment.

Figure 1:
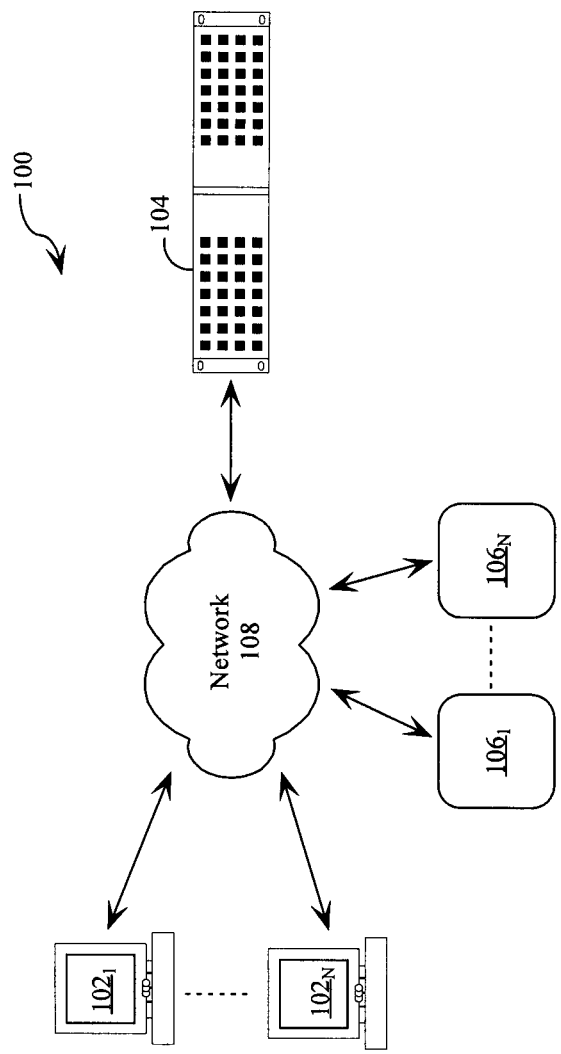
FIG. 1 is a block diagram of an exemplary software development system that is useful for understanding the present invention.

Referring now to FIG. 1, there is provided a schematic illustration of a software development system (SDS) 100. As shown in FIG. 1, the SDS 100 is comprised of developer computer systems (DCSs) $102_1, \ldots, 102_N$, an application server 104, databases $106_1, \ldots, 106_N$, and a network 108. Each of the above listed components $120_1, \ldots, 102_N$, 104, $106_1, \ldots, 106_N$ is well known to those having ordinary skill in the art, and therefore will not be described herein. However, a brief description of the SDS 100 is provided to assist a reader in understanding the present invention.

Referring again to FIG. 1, each of the DCSs $102_1, 102_N$ is a desktop personal computer system, a laptop personal computer system, a personal digital assistant, a mobile computing device, or any other general purpose computer processing device. Each of the DCSs $102_1, \ldots, 102_N$ is comprised of hardware and/or software configured to facilitate the development of application software. For example, each of the DCSs $102_1, \ldots, 102_N$ can be comprised of an open development platform including frameworks, software tools, and runtimes for building, deploying, and managing application software.

According to an embodiment of the invention, each of the DCSs $102_1, \ldots, 102_N$ is comprised of an Eclipse platform providing an Integrated Development Environment (IDE) tool for writing enterprise, client, servlet, php-based, and/or html-based application software in a particular computer language (e.g., Java, C, and C++). Still, the invention is not limited in this regard.

Referring again to FIG. 1, each of the DCSs $102_1, \ldots, 102_N$ is also comprised of a configuration editor software tool. The configuration editor software tool facilitates user-software actions for defining values for a set of initialization parameters for application software being developed and/or tested. The configuration editor software tool also facilitates user-software actions for storing initialization parameters in a memory device of the DCS $102_1, \ldots, 102_N$ and/or in a database $106_1, \ldots, 106_N$. The initialization parameters can be stored in accordance with a configuration file format. The configuration file can be in any file format selected in accordance with a particular SDS 100 application. Such file formats include, but are not limited to, an Extensible Markup Language (XML) file format. The initialization parameters can include, but are not limited to, information defining the number of database connections to be used by the application software and information defining service behaviors to be provided by the application software. The configuration editor software tool further facilitates user-software actions for modifying (updating or changing) initialization parameters of the configuration file.

Each of the DCSs $102_1, \ldots, 102_N$ communicates directly or indirectly with the application server 104 and databases $106_1, \ldots, 106_N$. If the DCSs $102_1, \ldots, 102_N$ communicate indirectly with the application server 104 and/or databases $106_1, \ldots, 106_N$, then the DCSs $102_1, \ldots, 102_N$ send and receive communications through the network 104. The network 104 can be a wireless network such as a local area network, a wide area network, or a personal area network.

The application server 104 is comprised of a single device, centralized computing devices, or decentralized computing devices. The application server 104 is comprised of hardware and/or software configured for creating, developing, deploying, and testing software programs and/or applications. For example, the application server 104 can be comprised of NetBeans including J2EE (Java 2, Enterprise Edition) support modules for creating, developing, deploying, and testing J2EE applications, Enterprise JavaBeans (EJB) components, Servlets, and web services. NetBeans, J2EE, and EJB are well known to those having ordinary skill in the art, and therefore will not be described herein. However, it should be understood that the invention is not limited in this regard.

The application server 104 is also comprised of hardware and/or software configured for managing resources of the application server and communications between the DCSs $102_1, \ldots, 102_N$ and the application server 104. Such resource and communications software can include, but is not limited to, managed beans (MBeans). MBeans are well known to those having ordinary skill in the art, and therefore will not be described herein. The invention is not limited in this regard.

The application server 104 is further comprised of hardware and/or software configured to access, initialize, and run application software deployed thereon. The application server 104 is also configured to perform certain steps of a configuration file updating process (CFUP) prior to or during the initialization of application software. This CFUP generally involves communicating a configuration file from a DCS $102_1, \ldots, 102_N$ to the application server 104 after application software has begun executing on the application server 104. The CFUP will be described in detail below in relation to FIGS. 4A-4B.

It should be noted that the CFUP provides an SDS 100 that overcomes certain drawbacks of conventional SDSs (such as the SDS described above in relation to the Background). For example, an SDS 100 implementing the CFUP (described below in relation to FIGS. 4A-4B) is absent of the need to restart an application server 104 each time a configuration file is modified (or updated). Rather, the SDS 100 implementing the CFUP (described below in relation to FIGS. 4A-4B) simply requires a restart of application software deployed on the application server 104 each time a configuration file is modified (or updated). One can appreciate that the application software re-start and configuration file updating features of the SDS 100 provide an efficient and less time consuming application software testing process as compared to application software testing processes performed using conventional SDSs (such as the SDS described above in relation to the Background).

Figure 2:
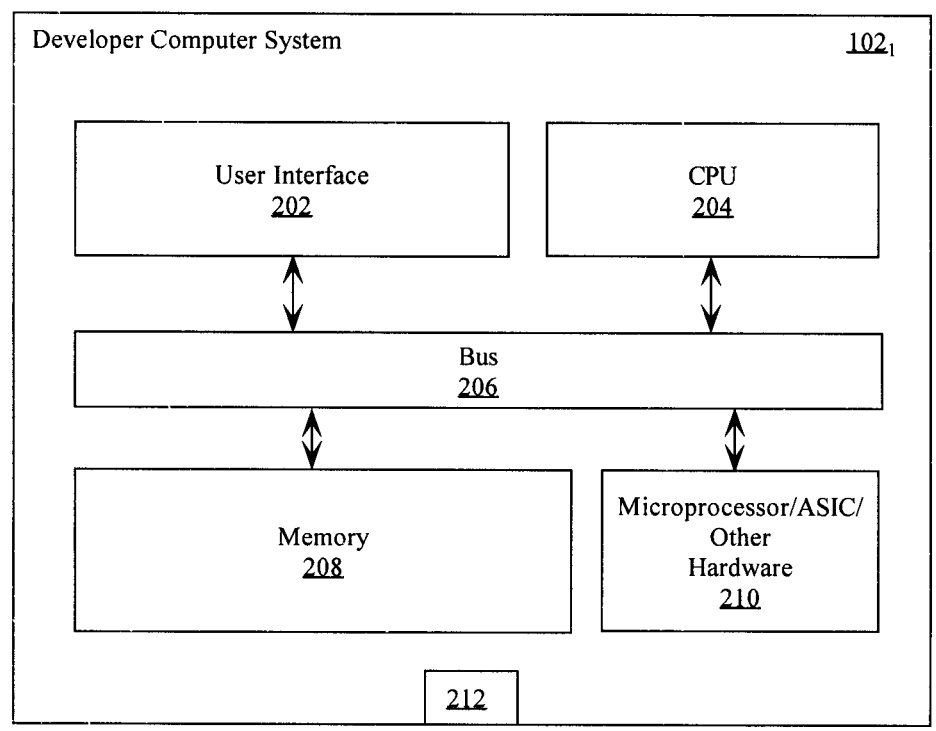
FIG. 2 is a block diagram of a developer computer system that is useful for understanding the present invention.

Referring now to FIG. 2, there is provided a block diagram of the DCS 102₁ that is useful for understanding the present invention. It should be noted that the DCSs 102₂, . . . , 102ₙ are the same as or substantially similar to the DCS 102₁. As such, the following description of the DCS 102₁ is sufficient for understanding the DCSs 102₂, . . . , 102ₙ.

Referring again to FIG. 2, the DCS 102₁ is comprised of a system interface 212, a user interface 202, a central processing unit (CPU) 204, a system bus 206, a memory 208 connected to and accessible by other portions of the DCS 102₁ through system bus 206, and hardware entities 210 connected to system bus 206. At least some of the hardware entities 210 perform actions involving access to and use of memory 208, which may be a RAM, a disk driver, and/or a CD-ROM.

User interface 202 facilitates a user action to create a request to access and launch software configured for facilitating the development of application software (described above in relation to FIG. 1). User interface 202 also facilitates a user action to create a request to access and launch a configuration editor software tool (described above in relation to FIG. 1) and other software tools for building, deploying, and managing application software. User interface 202 may comprise a display screen (not shown), speakers (not shown), and an input means (not shown), such as a keypad (not shown), a directional pad (not shown), a directional knob (not shown), and/or a microphone (not shown).

System interface 212 allows the DCS 102₁ to communicate with external computer processing devices (e.g., application server 104) through the network 108. System interface 212 also allows the DCS 102₁ to send and retrieve data from one or more external databases 106₁, . . . , 106ₙ.

Memory 208 can include I/O device driver program code and operating system program code. Memory 208 can also include software code for building, deploying, and managing application software. Memory 208 can further include a configuration file containing initialization parameter data, application software code, and configuration editor software tool program code.

Hardware entities 210 may include microprocessors, ASICs, and other hardware. Hardware entities 210 may include microprocessors programmed with an I/O device drivers and an operating system. Hardware entities 210 may also include a microprocessor programmed with software code for building, deploying, and managing application software. Hardware entities 210 may further include a microprocessor programmed with application software and configuration editor software for the configuration editor software tool.

Those skilled in the art will appreciate that the DCS 102₁ architecture illustrated in FIG. 2 is one possible example of a DCS 102₁. However, the invention is not limited in this regard and any other suitable DCS 102₁ architecture can also be used without limitation.

Figure 3:
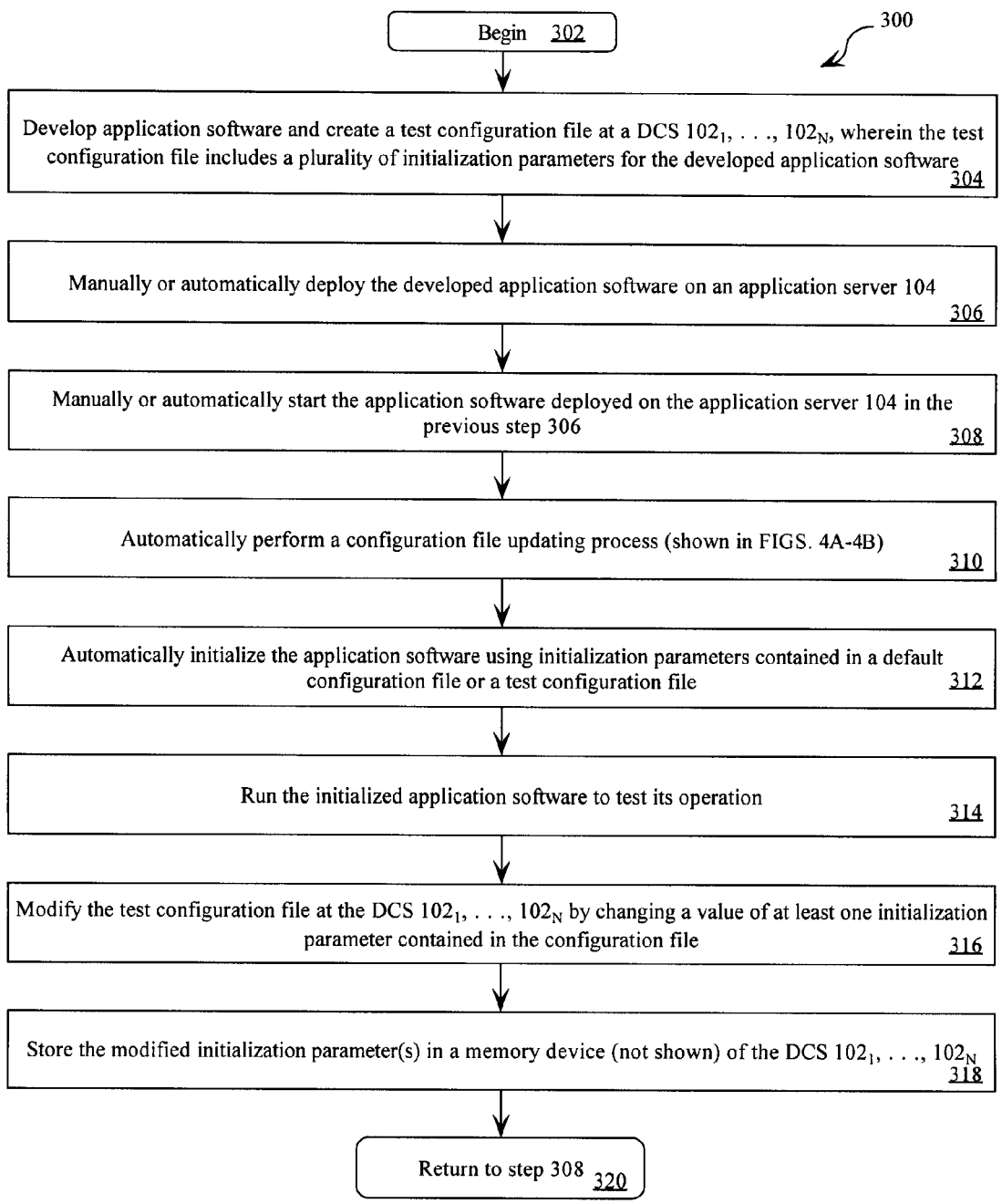
FIG. 3 is a flow diagram of an exemplary method for developing and testing application software that is useful for understanding the present invention.
Figure 4A:
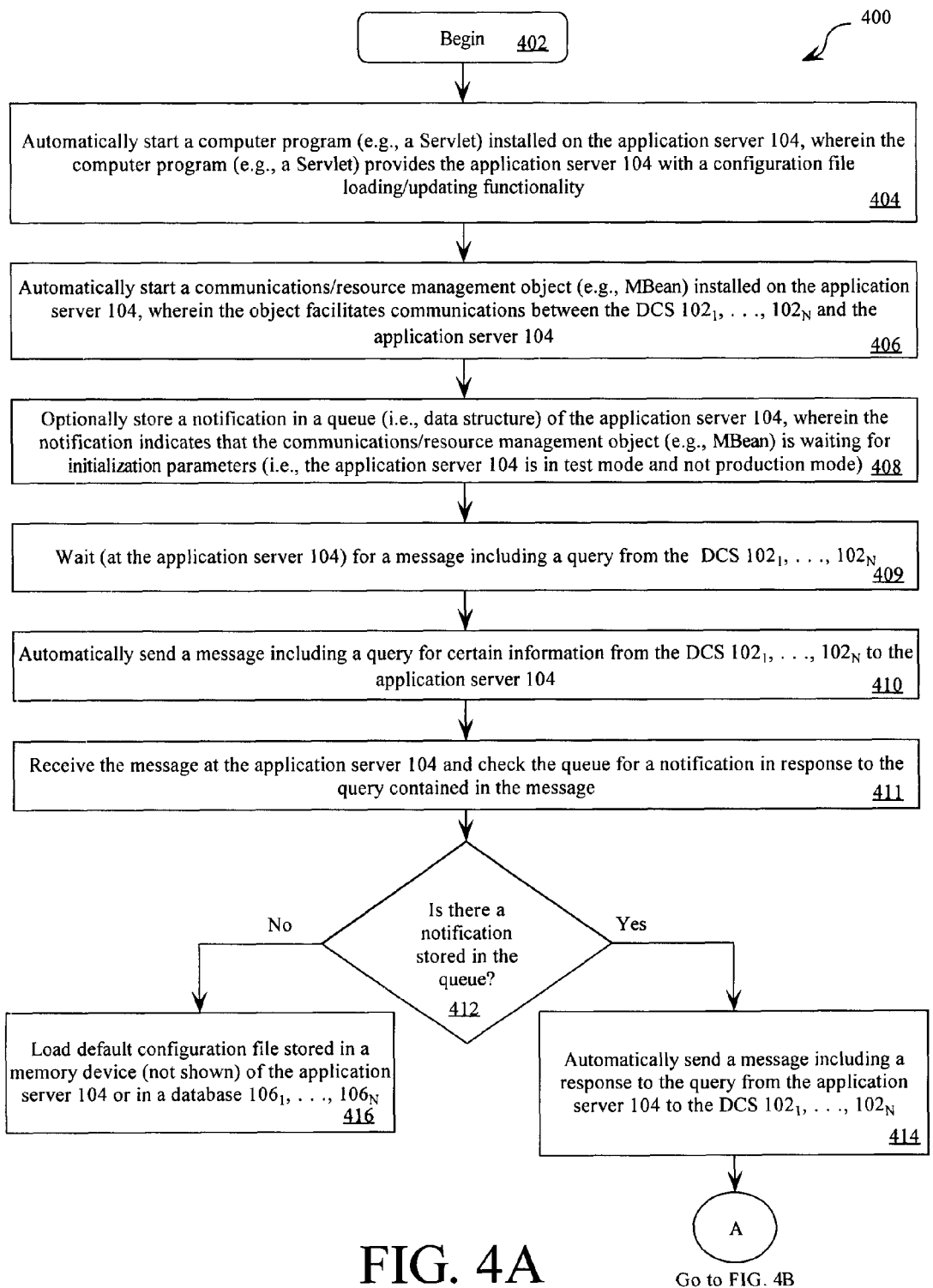
FIGS. 4A-4B collectively provide a flow diagram of an exemplary configuration file updating process that is useful for understanding the present invention.
Figure 4B:
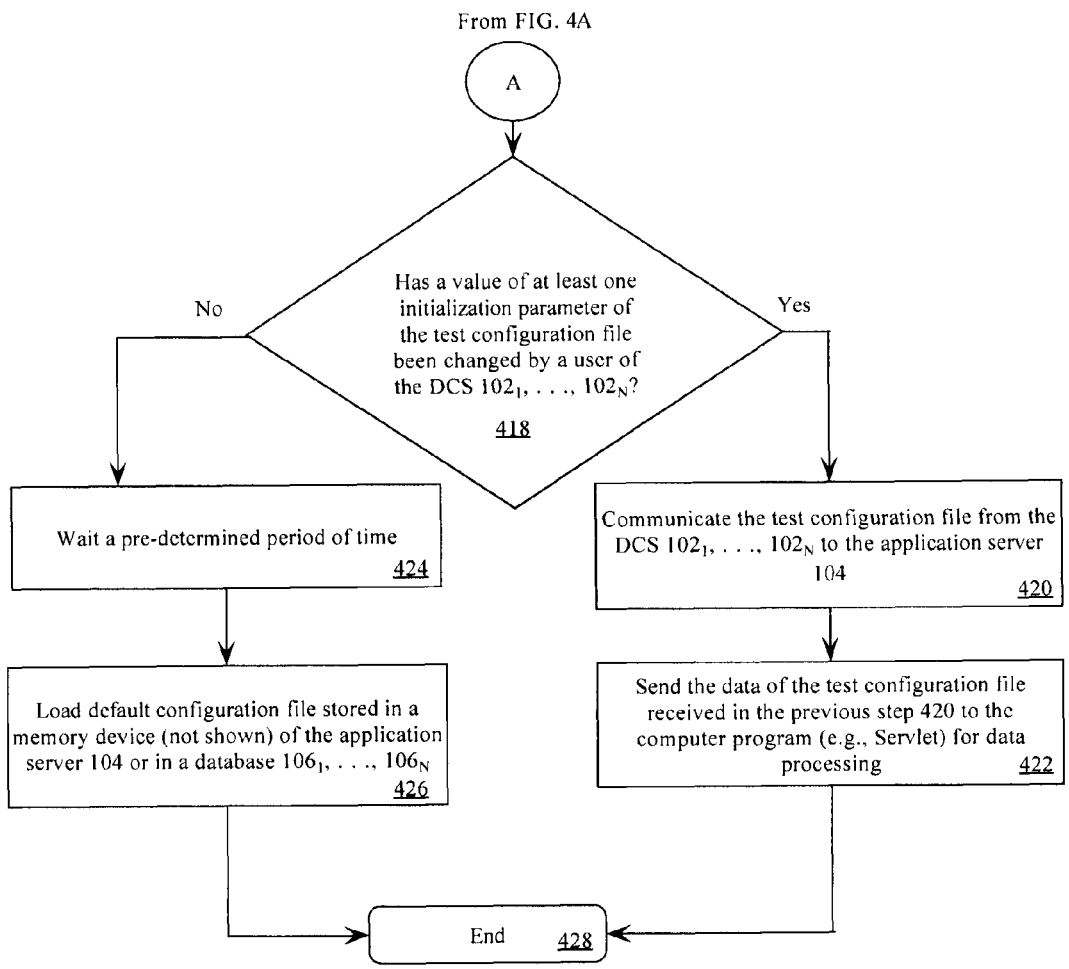

The following FIGS. 3-4B and accompanying text illustrate a method for developing, initializing, and testing application software. It should be appreciated, however, that the method disclosed herein is provided for purposes of illustration only and that the present invention is not limited solely to the method shown.

Referring now to FIG. 3, there is provided a flow diagram of an exemplary method 300 for developing and testing application software that is useful for understanding the present invention. As shown in FIG. 3, the method 300 begins with step 302 and continues with step 304. In step 304, application software is developed by a user of a DCS 102₁, . . . , 102ₙ (described above in relation to FIG. 1). Step 304 also involves creating a test configuration file at the DCS 102₁, . . . , 102ₙ (described above in relation to FIG. 1). The test configuration file can be created using a configuration editor software tool installed on the DCS 102₁, . . . , 102ₙ (described above in relation to FIG. 1). The test configuration file can include, but is not limited to, a plurality of initialization parameters for the developed application software.

Subsequent to step 304, the method 300 continues with step 306. In step 306, the developed application software is manually or automatically deployed on the application server 104 (described above in relation to FIG. 1). The term "deploy", as used herein, refers to the distribution of application software to at least one application server. Thereafter, step 308 is performed where the application software is manually or automatically started. The application software can be started using any technique known to those having ordinary skill in the art. Such techniques include, but are not limited to, selecting a particular application software from a drop down menu displayed on a DCS 102₁, . . . , 102ₙ and sending a command from the DCS 102₁, . . . , 102ₙ to the application server 104 for starting the execution of the application software.

After starting the application software, the method 300 continues with step 310. In step 310, a configuration file updating process (CFUP) is automatically performed. The CFUP also involves communicating a configuration file (such as the configuration file created in step 304) from the DCS 102₁, . . . , 102ₙ (described above in relation to FIG. 1) to the application server 104 (described above in relation to FIG. 1) after the application software has been started. The CFUP will be described in detail below in relation to FIGS. 4A-4B. It should be noted that the CFUP need not be performed prior to the initialization of the application software. Rather, the CFUP can be performed during an initialization process of the application software. In such as scenario, the CFUP can be performed during the following step 312.

Step 312 involves automatically initializing the application software. Initialization processes for application software are well known to those having ordinary skill in the art, and therefore will not be described herein. However, it should be understood that the initialization of the application software is performed using initialization parameters contained in a default configuration file or a test configuration file. The default configuration file can contain a plurality of initialization parameters having default values. The default configuration file can be stored in a memory device (not shown) of the application server 104 or in a database 106₁, . . . 106ₙ (described above in relation to FIG. 1) of an SDS 100 (described above in relation to FIG. 1). The test configuration file can contain a plurality of initialization parameters having test values. The test configuration file can be a file communicated from the DCS 102₁, . . . , 102ₙ to the application server 104 during the performance of the CFUP (described below in relation to FIGS. 4A-4B) in step 310.

Subsequent to completing step 312, the method 300 continues with step 314. In step 314, the initialized application software is run for purposes of testing its operations. It should be noted that the application software is run for a variety of reasons. For example, the applications software can be run so that a user (e.g., a software developer or engineer) can debug the software application. The term "debug", as used herein, refers to a process for checking, diagnosing, and removing errors in programs. The invention is not limited in this regard.

After completing step 314, step 316 is performed. In step 316, a user of the DCS $102_1, \ldots, 102_N$ can modify the test configuration file by changing a value of at least one initialization parameter contained therein. The value for the initialization parameter(s) can be changed based on the results of step 314. The value for the initialization parameter(s) can be changed using a configuration editor software tool installed on the DCS $102_1, \ldots, 102_N$. In step 318, the modified value(s) for the initialization parameter(s) are stored in the memory device (not shown) of the DCS $102_1, \ldots, 102_N$. Once the modified values for the initialization parameter(s) are stored, step 320 is performed where the method 300 returns to step 308. Notably, step 320 can be automatically performed in response to a user action for saving the modified value(s) for the initialization parameter(s).

Referring now to FIGS. 4A-4B, there is provided a flow diagram of an exemplary configuration file updating process (CFUP) 400 that is useful for understanding the present invention. The CFUP 400 can be performed in step 310 of method 300 (described above in relation to FIG. 3).

As shown in FIG. 4A, the CFUP 400 begins with step 402 and continues with step 404. In step 404, a computer program installed on the application server 104 (described above in relation to FIG. 1) is automatically started. It should be noted that step 402 can be performed in response to a user-software action for storing modified values for initialization parameter(s) (as indicated by steps 318 and 320 of FIG. 3). The computer program provides the application server 104 (described above in relation to FIG. 1) with a configuration file loading/updating functionality. The computer program may be a Web application (e.g., a banking application consisting of a Servlet, Java Service Pages (JSPs), Enterprise Java Beans). The computer program can be responsible for displaying a login page and providing transaction functions (e.g., banking transaction functions) after a user has logged in.

According to an embodiment of the invention, the computer program is a Servlet. The Servlet is a Java program which resides and executes on a server to provide functionality to the server or processing of data on the server. The server can act as a front end controller to route user requests to appropriate actions in an application (in addition to initializing the application). The invention is not limited in this regard.

After completing step 404, the CFUP 400 continues with step 406. In step 406, a communications/resource management object installed on the application server 104 (described above in relation to FIG. 1) is started. As should be understood, the communications/resource management object can be automatically started by the computer program, i.e., the computer program performs an operation to launch the communications/resource management object. The communications/resource management object facilitates communications between a DCS $102_1, \ldots, 102_N$ (described above in relation to FIG. 1) and the application server 104 (described above in relation to FIG. 1). The communications/resource management object acts as a transport to pass data back and forth between a DCS $102_1, \ldots, 102_N$ and an application server 104. This data transferring is achieved by using socket communication, transferring bits and bytes of data between devices. The communications/resource management object can also be responsible for re-constructing objects passed from a DCS $102_1, \ldots, 102_N$ to an application server 104. The communications/resource management object can further be responsible for storing re-constructed objects in a queue.

According to an embodiment of the invention, the communications/resource management object is an MBean. In such a scenario, the MBean provides certain functionalities to the application server 104. Such functionalities include, but are not limited to, providing remote access to clients (e.g., DCSs) to set/retrieve certain values and making certain resources available to remote clients for setting/retrieving certain values. The invention is not limited in this regard.

Subsequently, the CFUP 400 continues with step 408. It should be noted that step 408 can be an optional step. In such as scenario, step 408 can be performed if the application server 104 is in test mode. However, if the application server 104 is in production mode, then step 408 is not performed. In production mode, a default configuration file is loaded and used during the initialization of the application software.

Step 408 involves storing a notification in a queue (i.e., data structure) of the application server 104 (described above in relation to FIG. 1). Queues are well known to those having ordinary skill in the art, and therefore will not be described herein. This notification storage operation can be implemented by the computer program (e.g., a Servlet) started in the previous step 404. The notification can include information indicating that the communications/resource management object (e.g., MBean) is waiting for initialization parameters. The notification can also include information indicating the mode of the application server 104. Such modes can include, but are not limited to, a test mode and a production mode. The phrase "test mode", as used herein, refers to a mode intended to be used by authorized persons of an entity for testing operations of application software. The phrase "production mode", as used herein, refers to a mode intended to be used by persons of the general public for accessing and using application software provided by an entity.

After completing step 408, the CFUP 400 continues with step 409. In step 409, the application server 104 waits for a message including a query from the DCS $102_1, \ldots, 102_N$. It should be noted that if a message is not received at the application server 104 within a pre-determined period of time a default configuration file can be loaded. Steps illustrating this post period expiration process are not shown for simplicity purposes.

In step 410, a message including a query for certain information is sent from the DCS $102_1, \ldots, 102_N$ (described above in relation to FIG. 1) to the application server 104 (described above in relation to FIG. 1). It should be noted that this message can be sent as part of a polling process performed by the DCS $102_1, \ldots, 102_N$. Polling processes are well known to those having ordinary skill in the art, and therefore will not be described herein. However, it should be understood that the polling process generally involves periodically communicating messages from the DCS $102_1, \ldots, 102_N$ to the application server 104. The polling process can be performed in response to a user-software interaction for storing modified initialization parameters in a configurations file (step 320 of FIG. 3). The invention is not limited in this regard. For example, the polling process can be performed automatically or in response to any user-software interaction selected in accordance with a particular system 100 application.

Step 410 can involve polling the application server 104 (described above in relation to FIG. 1) for an answer to a query from the DCS $102_1, \ldots, 102_N$ (described above in relation to FIG. 1). The query can ask whether the application server 104 (described above in relation to FIG. 1) is waiting for a configuration file and/or whether the application server 104 is in a test mode. It should also be noted that this messaging operation can be implemented by an software development platform (e.g., an Eclipse platform) of the DCS $102_1, \ldots, 102_N$ (described above in relation to FIG. 1).

Thereafter, the CFUP 400 continues with step 411. In step 411, the message is received at the application server 104. In response to the query contained in the message, the application server 104 checks the queue for a notification.

If a notification was not stored in the queue in the previous step 408 [412: NO] (or if the application server 104 is in a default mode), then step 416 is performed. In step 416, a default configuration file is loaded. The default configuration file can contain a plurality of initialization parameters having default values. The default configuration file can be stored in a memory device (not shown) of the application server 104 (described above in relation to FIG. 1) or in a database 106$_1$, ..., 106$_N$ (described above in relation to FIG. 1). It should be noted that this loading operation can be implemented by the communications/resource management object (e.g., MBean) of the application server 104 (described above in relation to FIG. 1).

As stated above, the term "load", as used herein, refers to the process of transferring files from one memory device to another memory device. If the default configuration file is stored in a memory device (not shown) of the application server 104 (described above in relation to FIG. 1), then step 416 can involve transferring the default initialization parameters contained in the default configuration file from the memory device (not shown) to another memory device (not shown) of the application server 104 (described above in relation to FIG. 1). If the default configuration file is stored in a database 106$_1$, ..., 106$_N$ (described above in relation to FIG. 1), then step 416 can involve transferring the configuration file from the database to a memory device (not shown) of the application server 104 (described above in relation to FIG. 1).

If a notification was stored in the queue in the previous step 408 [312: YES] (or the application server 104 is in a test mode), then step 414 is performed. In step 414, a message including a response to the query is sent from the application server 104 (described above in relation to FIG. 1) to the DCS 102$_1$, ..., 102$_N$ (described above in relation to FIG. 1). The response can include information indicating that the application server 104 is waiting for a configuration file and/or is in a test mode. It should be noted that this messaging operation can be implemented by the communications/resource management object (e.g., MBean) of the application server 104 (described above in relation to FIG. 1).

Upon completing step 414, the CFUP 400 continues with a decision step 418 of FIG. 4B which is performed by the DCS 102$_1$, ..., 102$_N$ (described above in relation to FIG. 1). It should be noted that the DCS 102$_1$, ..., 102$_N$ (described above in relation to FIG. 1) can compare default initialization parameter values with initialization parameter values of the test configuration file to determined if at least one initialization parameter value of the test configuration file has been changed. Alternatively, the DCS 102$_1$, ..., 102$_N$ (described above in relation to FIG. 1) can simply have knowledge that at least one initialization parameter value of the test configuration file has been changed. This knowledge can be provided to the DCS 102$_1$, ..., 102$_N$ (described above in relation to FIG. 1) during step 318 of FIG. 3.

If none of the initialization parameter values of the test configuration file have been changed by a user of the DCS 102$_1$, ..., 102$_N$ (described above in relation to FIG. 1) [418: NO], then step 424 is performed. In step 424, the application server 104 (described above in relation to FIG. 1) waits a pre-defined period of time. The period of time can be selected as a time suitable for receiving a test configuration file from the DCS 102$_1$, ..., 102$_N$ (described above in relation to FIG. 1). In various embodiments of the present invention, the DCS 102$_1$, ..., 102$_N$ waits a pre-determined period of time to ensure that the default configurations file is not loaded while a test configuration file is being communicated to the applications server 104 from the DCS 102$_1$, ..., 102$_N$. However, it should be noted that the invention is not limited in this regard. For example, the CFUP 400 can be absent of step 424.

Step 426 is performed after the pre-defined period of time has lapsed. In step 426, the default configuration file is loaded from a database 106$_1$, ..., 106$_N$ to a memory device (not shown) of the application server 104 or from a first memory device (not shown) of the applications server 104 to a second memory device (not shown) of the applications server 104. In this regard, it should be noted that the memory device where the default configuration file is loaded is a memory device that is accessible to the application software being developed/tested (initialized in step 312 of FIG. 3. and run in step 314 of FIG. 3). This loading operation can be implemented by the communications/resource management object (e.g., MBean) of the application server 104 (described above in relation to FIG. 1). Subsequent to loading the default configuration file, step 428 is performed where the CFUP 400 ends.

If a value of at least one initialization parameter of the test configuration file has been changed by a user of the DCS 102$_1$, ..., 102$_N$ (described above in relation to FIG. 1) [418: YES], then step 420 is performed. In step 420, a modified test configuration file is communicated from the DCS 102$_1$, ..., 102$_N$ (described above in relation to FIG. 1) to the application server 104 (described above in relation to FIG. 1). It should be noted that that this communications can be achieved using any streaming technology known to those having ordinary skill in the art. In such a scenario, the streaming technology of the DCS 102$_1$, ..., 102$_N$ can be implemented by hardware entities 210 and/or system interface 212. The streaming technology of the application server 104 can be implemented by a device having the communications/resource management object (e.g., MBean) installed thereon. The term "streaming", as used herein, refers to a transfer of data from one device to another device in a manner so that the data doesn't have to be completely downloaded for the receiving device to use and/or process the same.

After completing step 420, step 422 is performed. In step 422, the data received in the previous step 420 is sent from the communications/resource management object (e.g., MBean) of the application server 104 to the computer program (e.g., a Servlet) for data processing. Subsequently, step 428 is performed where the CFUP 400 ends.

The following example is provided in order to further illustrate the present invention. The scope of the invention, however, is not to be considered limited in any war thereby.

EXAMPLE

Figure 5:
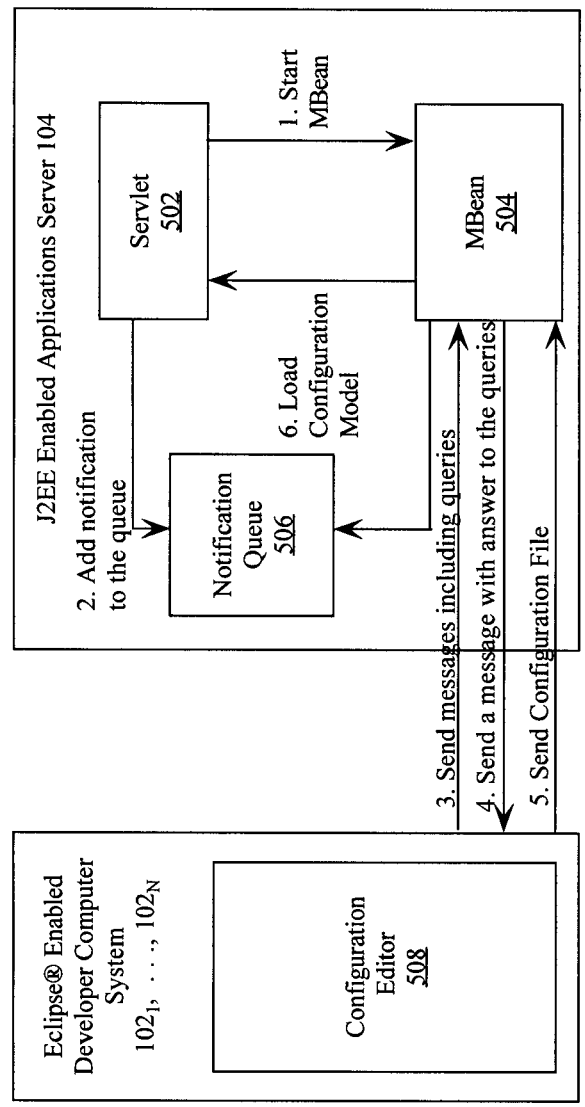
FIG. 5 is a schematic illustration of an exemplary simulation process according to an embodiment of the invention.

Referring now to FIG. 5, there is provided a schematic illustration of an exemplary simulation process 500 according to an embodiment of the invention. It should be understood that the following description assumes that the applications server 104 is J2EE enabled and the DCS 102$_1$, ..., 102$_N$ is Eclipse® enabled. The following description also assumes that a configuration file (not shown) is loaded in an Eclipse® editor (not shown). The following description further assumes that the applications server 104 is in a test mode. Eclipse® editors are well known to those having ordinary skill in the art, and therefore will not be described herein. However, it should be understood that the Eclipse® editor (not shown) is used by simulation software (not shown) deployed on a J2EE enabled applications server 104.

During a first initialization sequence of the applications server 104, the applications server 104 invokes a Servlet's 502 initialization method. Servlet initialization methods are well known to those having ordinary skill in the art, and therefore will not be described herein. Upon being invoked, the Servlet 502 initializes an MBean 504 (represented by step 1 shown in FIG. 5) and adds a notification in a notification queue 506 (represented by step 2 shown in FIG. 5). During the initialization of the MBean 504, the MBean 504 waits for the DCS $102_1, \ldots, 102_N$ to communicate a configuration file (not shown) to the applications server 104.

The DCS $102_1, \ldots, 102_N$ (using configuration editor software 508) polls the applications server 104 (using the MBean 504) for any new notifications (represented by step 3 shown in FIG. 5). More particularly, the DCS $102_1, \ldots, 102_N$ sends messages to the applications server 104, wherein the messages include queries for certain information (such as the mode of the applications server 104 or if the applications server is waiting for a configurations file). In turn, the applications server 104 sends a message including an answer to the queries (represented by step 4 of FIG. 5). The answer can include information indicating that the applications server 104 is in a test mode or is waiting for a configurations file (not shown). Upon receiving a message including an answer to the query, the DCS $102_1, \ldots, 102_N$ communicates the configuration file (not shown) to the applications server 104 (represented by step 5 shown in FIG. 5). The configurations file (not shown) is communicated to the applications server 104 using streaming technology. Thereafter, the MBean 504 processes the received configurations file (not shown) and sends the processed configuration file (not shown) to the Servlet 502 for use in initializing applications software (represented by step 6 shown in FIG. 5).

As a result of the above described process, a user can test a new path by making modifications to the configuration file (not shown) using the configurations editor 508 and save the modified configurations file (not shown). The save operation triggers a restart of the applications software deployed in the remote applications server 104.

It should be noted that the computer program code for carrying out operations of embodiments of the present invention may be written in an object oriented programming language, such as Java, Smalltalk, C++, or the like. However, the computer program code for carrying out operations of embodiments of the present invention may also be written in conventional procedural programming languages, such as the "C" programming language or similar programming languages.

The program code may execute entirely on the user's computer, partly on the user's computer, as a stand-alone software package, partly on the user's computer and partly on a remote computer or entirely on a remote computer or server. In the latter scenario, the remote computer may be connected to the user's computer through a local area network (LAN), or a wide area network (WAN), or the connection may be made to an external computer (for example, through the Internet using an Internet Service Provider).

In light of the forgoing description of the invention, it should be recognized that the present invention can be realized in hardware, software, or a combination of hardware and software. The methods of the present invention can be realized in a centralized fashion in one processing system, or in a distributed fashion where different elements are spread across several interconnected processing systems. Any kind of computer system, or other apparatus adapted for carrying out the methods described herein, is suited. A typical combination of hardware and software could be a general purpose computer processor, with a computer program that, when being loaded and executed, controls the computer processor such that it carries out the methods described herein. Of course, an application specific integrated circuit (ASIC), and/or a field programmable gate array (FPGA) could also be used to achieve a similar result.

The present invention can also be embedded in a computer program product, which comprises all the features enabling the implementation of the methods described herein, and which, when loaded in a computer system, is able to carry out these methods. Computer program or application in the present context means any expression, in any language, code or notation, of a set of instructions intended to cause a system having an information processing capability to perform a particular function either directly or after either or both of the following: (a) conversion to another language, code or notation; (b) reproduction in a different material form. Additionally, the description above is intended by way of example only and is not intended to limit the present invention in any way, except as set forth in the following claims.

All of the apparatus, methods and algorithms disclosed and claimed herein can be made and executed without undue experimentation in light of the present disclosure. While the invention has been described in terms of preferred embodiments, it will be apparent to those of skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those skilled in the art are deemed to be within the spirit, scope and concept of the invention as defined.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the following claims.

We claim:

1. A machine-readable medium having stored thereon instructions, which when executed by a machine, cause the machine to perform the following operations comprising:

starting an application software deployed on an application server communicatively connected to a developer computer system;

subsequent to starting said application software, determining if said application software is executing in a test mode or in a production mode, said test mode comprising a mode intended to be used by authorized persons of an entity for testing operations of application software, and said production mode comprising a mode intended to be used by persons of a general public for accessing and using application software provided by said entity;

when in production mode, exclusively causing a default configuration file including at least one default initialization parameter to be communicated from said developer computer system to said application server;

when executing in a test mode, determining if a change has occurred with respect to at least one test initialization parameter in a test configuration file of said application software;

when results of said determining indicate that a change has occurred with respect to said at least one test initialization parameter, exclusively causing said test configuration file including said at least one test initialization parameter which has been changed to be communicated from said developer computer system to said application server; and initializing said application software using said default configuration file or said test configuration file;

wherein only said application software is caused to be restarted each time a change is made to said test configuration file so as to bring test initialization parameter updates into service.

2. The machine-readable medium of claim 1, further comprising instructions to cause the operation of streaming said configuration file from said developer computer system to said application server.

3. The machine-readable medium of claim 1, further comprising instructions to cause the operation of storing a notification in a queue of said application server, wherein said notification comprises information indicating a mode of said application server.

4. The machine-readable medium of claim 1, further comprising instructions to cause the operation of waiting for a message comprising a query from said developer computer system, wherein said query asks for said mode of said application server.

5. The machine-readable medium of claim 1, further comprising instructions to cause the operation of communicating an answer to said query from said application server to said developer computer system and waiting for a configuration file from said developer computer system.

6. The machine-readable medium of claim 4, further comprising instructions to cause the operation of sending data of said configuration file to said application software for data processing prior to said initialization step.

7. A system configured for updating initialization parameters for application software from within a software development environment, said application software being deployed on an application server, comprising:

a developer computer system communicatively coupled to said application server and configured to change a value of at least one test initialization parameter contained in a test configuration file, automatically re-starting only said application software in response to a user-software action for storing modified values for said test initialization parameter, receiving a notification from the application server which specifies whether the application software is operating in a test mode or a production mode, said test mode comprising a mode intended to be used by authorized persons of an entity for testing operations of application software, and said production mode comprising a mode intended to be used by persons of a general public for accessing and using application software provided by said entity, if said application software is operating in a production mode, then exclusively causing a default configuration file including at least one default initialization parameter to be communicated from said developer computer system to said application server, and if said application software is operating in a test mode, then streaming said test configuration file to said application server subsequent to re-starting said application software and prior to initialization of said application software.

8. The system according to claim 7, wherein said developer computer system is further configured for polling said application server for an answer to a query asking for said mode of said application server.

* * * * *